US012244647B2

(12) United States Patent
Verma et al.

(10) Patent No.: US 12,244,647 B2
(45) Date of Patent: Mar. 4, 2025

(54) CONTEXT-BASED SECURITY IN MOBILE NETWORKS USING AN API AND A DATA STORE

(71) Applicant: Palo Alto Networks, Inc., Santa Clara, CA (US)

(72) Inventors: Sachin Verma, Danville, CA (US); Leonid Burakovsky, Pleasanton, CA (US); Srikanth Ramachandran, Hayward, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 153 days.

(21) Appl. No.: 18/103,011

(22) Filed: Jan. 30, 2023

(65) Prior Publication Data
US 2024/0259428 A1     Aug. 1, 2024

(51) Int. Cl.
*G06F 7/04*     (2006.01)
*H04L 9/40*     (2022.01)

(52) U.S. Cl.
CPC .......... *H04L 63/20* (2013.01); *H04L 63/1425* (2013.01)

(58) Field of Classification Search
CPC . H04L 63/20; H04L 63/1425; H04L 63/0236; H04L 63/0876; H04L 63/1408; H04W 12/37
See application file for complete search history.

(56) References Cited

U.S. PATENT DOCUMENTS

| | | | | |
|---|---|---|---|---|
| 2015/0052247 | A1* | 2/2015 | Threefoot | H04L 67/10 709/225 |
| 2021/0352045 | A1* | 11/2021 | Kodavanty | H04L 61/5076 |
| 2022/0174096 | A1* | 6/2022 | Schmitt | H04L 63/062 |
| 2022/0394088 | A1* | 12/2022 | Salkintzis | H04L 67/1036 |
| 2024/0121655 | A1* | 4/2024 | Huang | H04W 28/0268 |

FOREIGN PATENT DOCUMENTS

EP     3902226     12/2022

OTHER PUBLICATIONS

Girao et al., A Practical Approach to Provide Communication Privacy, Jun. 15, 2006, IEEE, pp. 1965-1970. (Year: 2006).*
Liu et al., Secure Name Resolution for Identifier to Locator Mappings in the Global Internet, Aug. 2, 2013, IEEE, pp. 1-7. (Year: 2013).*

(Continued)

*Primary Examiner* — Philip J Chea
*Assistant Examiner* — Jenise E Jackson
(74) *Attorney, Agent, or Firm* — Van Pelt, Yi & James LLP

(57) ABSTRACT

Techniques for applying context-based security in mobile networks using an API and a data store are disclosed. In some embodiments, a system/process/computer program product for applying context-based security in mobile networks using an API and a data store includes monitoring network traffic on a mobile network at a security platform to identify a new session; determining user-IP mapping information associated with the new session using an API and a data store; and enforcing a security policy on the new session at the security platform based on the user-IP mapping information to apply context-based security in the mobile network.

20 Claims, 12 Drawing Sheets

(56) References Cited

OTHER PUBLICATIONS

Dolly et al., Draft Recommendation Y.secMechanisms, NGN Security Mechanisms and Procedures (Seoul, Jan. 14-25, 2008), TD 433 (WP 2/13), ITU-T Draft; Study Period 2005-2008, International Telecommunication Union, Geneva ; CH, vol. 15/13, Jan. 24, 2008 (Jan. 24, 2008), pp. 1-40.

Gomez et al., "Controller-Oblivious Dynamic Access Control in Software-Defined Networks", 2019 49th Annual IEEE/IF IP International Conference On Dependable Systems and Networks (DSN), IEEE, Jun. 24, 2019 (Jun. 24, 2019), pp. 447-459.

Manolache et al., "Directory cache techniques for efficient user management", Roedunet International Conference (Roedunet), 2011 10th, IEEE, Jun. 23, 2011 (Jun. 23, 2011), pp. 1-5.

3GPP, 3GPP TS 23.501 V17.5.0 (Jun. 2022), Technical Specification, 3rd Generation Partnership Project; Technical Specification Group Services and System Aspects; System architecture for the 5G System (5GS); Stage 2 (Release 17), pp. 1-568.

3GPP, 3GPP TS 23.003 V16.9.0 (Mar. 2022), Technical Specification, 3rd Generation Partnership Project; Technical Specification Group Core Network and Terminals; Numbering, addressing and identification; (Release 16), pp. 1-143.

Covaci et al., Towards Autonomous Security Assurance in 5G Infrastructures, Sep. 20, 2018, pp. 1-9.

Gai et al., Intrusion Detection Techniques for Mobile Cloud Computing in Heterogeneous 5G, Research Article, Security and Communication Networks, Security Comm. Networks 2016, 9:3049-3058, Feb. 11, 2015.

Horn et al., Towards 5G Security, IEEE, 2015 IEEE Presented at the 14th IEEE International Conference on Trust, Security, and Privacy in Computing and Communications, Aug. 20-22, 2015.

Liyanage et al., Software Defined Security Monitoring in 5G Networks, Chapter 10, Jan. 2018, pp. 231-243.

\* cited by examiner

CONTEXT-BASED SECURITY IN MOBILE NETWORKS USING AN API AND A DATA STORE

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1A:
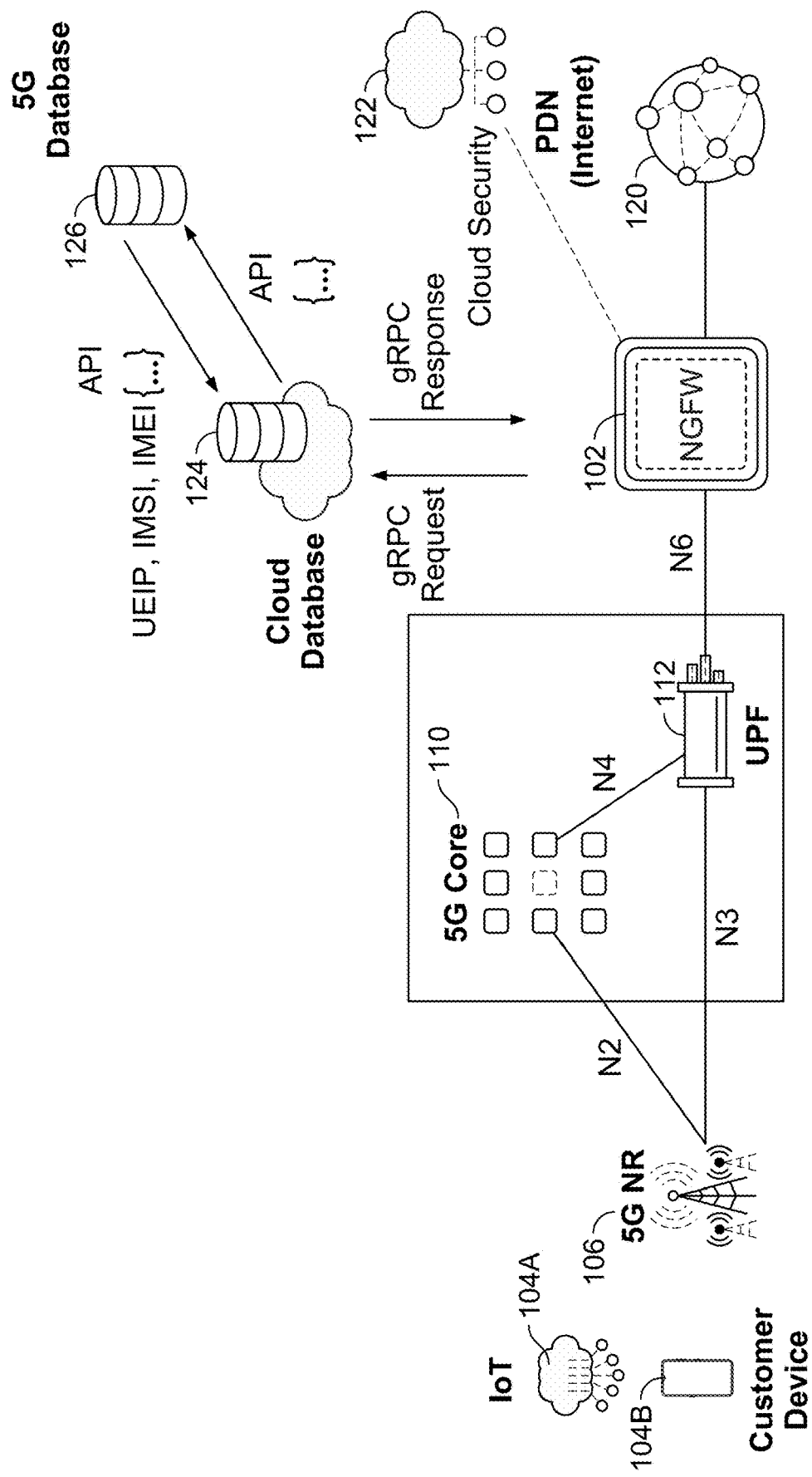
FIG. 1A is a block diagram of an architecture of a 5G wireless network with a security platform for applying context-based security in mobile networks using an API and a data store in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QOS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls).

For example, Palo Alto Networks' next generation firewalls enable enterprises and service providers to identify and control applications, users, and content—not just ports, IP addresses, and packets-using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Overview of Techniques for Applying Context-Based Security in Mobile Networks Using an API and a Data Store Technical and security challenges with service provider networks exist for devices in mobile networks (e.g., 4G/LTE and 5G mobile networks). For example, some 4G/LTE and 5G networks (e.g., including private and public cloud-based 4G/LTE and 5G networks) do not expose 3GPP interfaces between network functions, which prevents deployment of security solutions (e.g., firewalls, such as NGFWs) on these interfaces to apply context-based security to network traffic on such 4G/LTE and 5G networks. Specifically, some mobile service providers are reluctant to deploy such security solutions on 3GPP interfaces due to concerns over potential latency impacts and service outages.

As such, what are needed are new and improved security techniques for devices communicating on such service provider network environments (e.g., mobile networks, including various 4G/LTE and 5G mobile networks). Specifically, what are needed are new and improved solutions for monitoring such network traffic and applying context-based security (e.g., security/firewall policies) in mobile networks using an API and a data store (e.g., a database or another data store), such as for devices communicating on service provider networks (e.g., including for applying context-based security in mobile networks using IMSI, IMEI, RAT type, Network Slice, DNN/APN, location, user IP, and/or other context-based information).

In some embodiments, a system/process/computer program product for applying context-based security in mobile networks using an API and a data store includes monitoring network traffic on a mobile network at a security platform to identify a new session; determining user-IP mapping information associated with the new session using an API and a data store; and enforcing a security policy on the new session at the security platform based on the user-IP mapping information to apply context-based security in the mobile network.

In some embodiments, a system/process/computer program product for applying context-based security in mobile networks using an API and a data store includes monitoring network traffic on a mobile network at a security platform to identify a new session; determining user-IP mapping information associated with the new session by performing at least one of the following: querying a local user-IP mapping table stored at the security platform using an IP address of a packet associated with the new session; querying a cloud-based data store using the IP address of the packet associated with the new session if the IP address is not stored in the local user-IP mapping table; and sending an API query to another data store that includes user contextual information if the IP address is not stored in the cloud-based data store; and enforcing a security policy on the new session at the security platform based on the user-IP mapping information to apply context-based security in the mobile network.

Specifically, context-based security can be applied using a security platform in mobile networks, including 4G/LTE and 5G mobile networks, by using an API(s) and a database. In this example, the mobile network(s) can include a database that stores contextual information related to a subscriber/user including IMSI, IMEI, RAT type, Network Slice, DNN/APN, location, user IP, and/or other contextual information. The security platform can be deployed on, for example, an SGi interface in a 4G/LTE network and an N6 interface in a 5G network.

In some embodiments, a data store (e.g., a cloud-based database) maintains a global user-IP mapping table and a security platform maintains a subset of a user-IP mapping table. For a packet, the security platform uses the IP address of the packet to query the local user-IP mapping table stored in the security platform. The corresponding user information can then be fetched to apply the security policy using the fetched user information. If the user-IP mapping does not exist in the local user-IP mapping table stored in the security platform, then the security platform queries a cloud-based global user-IP mapping database to obtain the user-IP mapping information, such as further described below with respect to FIGS. 1A-1B. In an example implementation, the user-IP mapping query with the cloud-based database can be performed using batch operations on periodic intervals using gRPC to facilitate high performance. If the cloud-based global user-IP mapping database does not have the queried user-IP mapping, then it will send an API query with the IP information to another database that stores user contextual information including, for example, IMSI/SUPI, IMEI/PEI, S-NSSAI, APN/DNN, RAT Type, and Location in a mobile network. Examples of such database in 5G include a Unified Data Repository (UDR) and Unstructured Data Storage Function (UDSF), such as will be further described below with respect to various embodiments.

In some embodiments, a data store (e.g., a cloud-based database) maintains a global user-IP mapping table and a security platform maintains a subset of a user-IP mapping table as similarly described below with respect to FIGS. 1A-1B and 2. However, in these embodiments, such as further described below with respect to FIGS. 1C-1D, an entity including a database, a network function, and a management system triggers an API based on certain events, such as UE attach and UE detach events. Specifically, the API can be used to push user contextual information to the cloud-based database that includes UE IP and user contextual information, including, for example, IMSI/SUPI, IMEI/PEI, S-NSSAI, APN/DNN, RAT Type, and Location information in a mobile network. The cloud-based database pushes the new and updated user-IP mappings to the security platform using batch operations on regular intervals using gRPC to achieve high performance. APIs can also be used to push user-IP mappings to the security platform.

In some embodiments, a security platform maintains a user-IP mapping table as similarly described below with respect to FIGS. 1A-1B and 2, except in this example, the security platform maintains a complete (not a subset of the) user-IP mapping table. As such, in these embodiments, such as further described below with respect to FIGS. 1E-1F, an entity including a database, a network function, and a management system triggers an API based on certain events, such as UE attach and UE detach events. Specifically, the API can be used to push user contextual information to the security platform that includes UE IP and user contextual information, including, for example, IMSI/SUPI, IMEI/PEI, S-NSSAI, APN/DNN, RAT Type, and Location information in a mobile network.

For example, the above-described techniques can be performed to apply context-based (e.g., Subscriber-ID related, Equipment-ID related, Network Slice related, etc.) security using user-IP mappings provided by the customer over an SGi interface in a 4G/LTE network and over an N6 interface in a 5G network.

As another example, the above-described techniques can be performed to apply context-based (e.g., Equipment-ID related) known and unknown threat identification and prevention over an SGi interface in a 4G/LTE network and over an N6 interface in a 5G network.

As yet another example, the above-described techniques can be performed to apply context-based (e.g., Subscriber-ID related) Application Identification over an SGi interface in a 4G/LTE network and over an N6 interface in a 5G network.

As yet another example, the above-described techniques can be performed to apply context-based (e.g., Subscriber-ID related) URL filtering over an SGi interface in a 4G/LTE network and over an N6 interface in a 5G network.

As such, service providers and/or enterprises can use the disclosed techniques and security platform to apply subscriber-ID based security over IP-based external network (e.g., the Internet) perimeters.

As such, the disclosed techniques facilitate enhanced context-based security in mobile networks. For example, security functions (e.g., security platforms) can be located closer to the user/device (e.g., UE) for performing security policy analysis and enforcement. As another example, security functions can be implemented to facilitate security for selective industry verticals. As yet another example, security can be implemented in highly sensitive locations, such as government network environments, military network environments, and power plant or other critical infrastructure network environments.

Accordingly, new and improved security solutions that facilitate applying security (e.g., network-based security) using a security platform for performing the disclosed techniques for applying context-based security in mobile networks using an API and a data store (e.g., the security platform can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) in a mobile network (e.g., a 4G/5G/6G/later versions of mobile networks) on various interfaces and protocols in mobile network environments are disclosed in accordance with some embodiments.

These and other embodiments and examples for applying context-based security (e.g., including for applying context-based security in mobile networks using IMSI, IMEI, RAT type, Network Slice, DNN/APN, location, user IP, and/or other context-based information) in mobile networks using an API and a data store will be further described below.
Example System Architectures for Applying Context-Based Security in Mobile Networks Using an API and a Data Store Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc, or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, GTP-U sessions (e.g., GTP-U traffic) over various interfaces (e.g., RESTful APIs; SGi, N6, and/or other interfaces in a 4G/5G/6G core network) to apply security on user plane traffic based on a policy (e.g., layer-7 security and/or other security policy enforcement) as further described below.

Specifically, as will now be described with respect to various system embodiments, context-based security can be applied using a security platform in mobile networks, including 4G/LTE and 5G mobile networks, by using an API(s) and a database. In this example, the mobile network(s) can include a database that stores contextual information related to a subscriber/user including IMSI, IMEI, RAT type, Network Slice, DNN/APN, location, user IP, and/or other contextual information. The security platform can be deployed on, for example, an SGi interface in a 4G/LTE network and an N6 interface in a 5G network.
Cloud-Based Data Store Maintains a Global User-IP Mapping Table and Security Platform Maintains a Subset of the User-IP Mapping Table In some embodiments, a data store (e.g., a cloud-based database) maintains a global user-IP mapping table and a security platform maintains a subset of a user-IP mapping table. For a packet, the security platform uses the IP address of the packet to query the local user-IP mapping table stored in the security platform. The corresponding user information can then be fetched to apply the security policy using the fetched user information. If the user-IP mapping does not exist in the local user-IP mapping table stored in the security platform, then the security platform queries a cloud-based global user-IP mapping database to obtain the user-IP mapping information. In an example implementation, the user-IP mapping query with the cloud-based database can be performed using batch operations on periodic intervals using gRPC to facilitate high performance. If the cloud-based global user-IP mapping database does not have the queried user-IP mapping, then it will send an API query with the IP information to another database that stores user contextual information including, for example, IMSI/SUPI, IMEI/PEI, S-NSSAI, APN/DNN, RAT Type, and Location in a mobile network. Examples of such database in 5G include a Unified Data Repository (UDR) and Unstructured Data Storage Function (UDSF) as shown in FIG. 2, such as will be further described below with respect to various embodiments.

FIG. 1A is a block diagram of an architecture of a 5G wireless network with a security platform for applying context-based security in mobile networks using an API and a data store in accordance with some embodiments. Specifically, FIG. 1A is an example 5G mobile network environment that includes a Security Platform 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for applying subscriber-ID based security in mobile networks with user-ID and syslog message networks over various interfaces (e.g., SGi and/or other interfaces in a 4G/LTE core network, and N6 interfaces and/or other interfaces in a 5G core network) in mobile networks (e.g., 4G/LTE or later mobile networks) as further described below.

As referred to herein, IMSI is the concept referred to by ITU-T as the "International Mobile Subscription Identity." IMSI is a 14 or 15 digit number.

As also referred to herein, SUPI is a globally unique 5G "Subscription Permanent Identifier" allocated to each subscriber in the 5G system. As per 3GPP T.S 23.003 v 16.9.0, a SUPI type may indicate an IMSI, a network access identifier (NAI), a Global Line Identifier (GLI), or a Global Cable Identifier (GCI).

As also referred to herein, International Mobile Equipment Identifier (IMEI) is defined in 3GPP TS 23.003 available at https://portal.3gpp.org/desktopmodules/Specifications/SpecificationDetails.aspx?specificationId=729.

As shown in FIG. 1A, the 5G mobile network environment can also include 5G New Radio (NR) access as shown at 106 and/or other networks including, for example, Wi-Fi access and Fixed access (not shown), to facilitate data communications for subscribers (e.g., using User Equipment (UE), such as smart phones, laptops, computers (which may be in a fixed location), and/or other cellular enabled computing devices/equipment, such as IoT devices as shown at 104A and/or UEs, such as a customer device as shown at 104B, or other network communication enabled devices) including over a Packet Data Network (PDN) (e.g., the Internet) 120 to access various applications, web services, content hosts, etc, and/or other networks. Each of the above-described 4G/LTE network access mechanisms are in communication with a 5G Core Network 110 that includes a User Plane Function (UPF) 112. UPF 112 is in communication with PDN (Internet) 120 via an N6 interface in which Security Platform 102 is located in line between UPF 112 and PDN 120. Security Platform 102 is in communication with UPF 112 (e.g., via the N6 interface, as shown) to access UE IP, IMEI, IMSI, and/or other contextual information as will be further described below.

Referring to FIG. 1A, network traffic communications are monitored using Security Platform 102. As shown, network traffic communications are monitored/filtered in the 5G network using Security Platform 102 (e.g., (virtual) devices/appliances that each include a firewall (FW), a network sensor acting on behalf of the firewall, or another device/component that can implement security policies using the disclosed techniques) configured to perform the disclosed techniques for applying context-based security over various interfaces (e.g., SGi and/or other interfaces in a 4G/LTE core network, and N6 and/or other interfaces in a 5G core network) in mobile networks as similarly described above and as further described below.

In this example implementation, the disclosed techniques for applying context-based security in mobile networks using an API and a data store can be performed using a security platform deployed in a 5G technology-based mobile network, such as shown in FIG. 1A. Specifically, cloud-based database 124 maintains a global user-IP mapping table and security platform 102 maintains a subset of a user-IP mapping table stored in the security platform. For a packet, the security platform uses the IP address of the packet to query the local user-IP mapping table. The corresponding user information can then be fetched to apply the security policy using the fetched user information. If the user-IP mapping does not exist in the local user-IP mapping table stored in the security platform, then the security platform queries the cloud-based global user-IP mapping database to obtain the user-IP mapping information. In an example implementation, the user-IP mapping query with the cloud-based database can be performed using batch operations on periodic intervals using gRPC to facilitate high performance. If cloud-based global user-IP mapping database 124 does not have the queried user-IP mapping, then it will send an API query with the IP information to another database, shown as a 5G database 126, that stores user contextual information including, for example, IMSI/SUPI, IMEI/PEI, S-NSSAI, APN/DNN, RAT Type, and Location in a mobile network. Examples of such database in 5G include a Unified Data Repository (UDR) and Unstructured Data Storage Function (UDSF), such as shown in FIG. 2 as will be further described below.

In some embodiments, a security platform is further configured to provide the following DPI capabilities: DPI of IP traffic over the N6 interface. In an example implementation, the security platform is configured to provide DPI capabilities (e.g., including to identify an APP ID, a user ID, a content ID, perform URL filtering, etc.) of, for example, IP sessions over N6 interfaces between UPF 112 and PDN 120 to apply security on user plane traffic based on a policy (e.g., layer-7 security and/or other security policy enforcement) as further described below.

In addition, Security Platform 102 can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the security platforms with dynamic prevention signatures for malware, DNS, URLs, CNC malware, and/or other malware as well as to receive malware samples for further security analysis.

Figure 2:
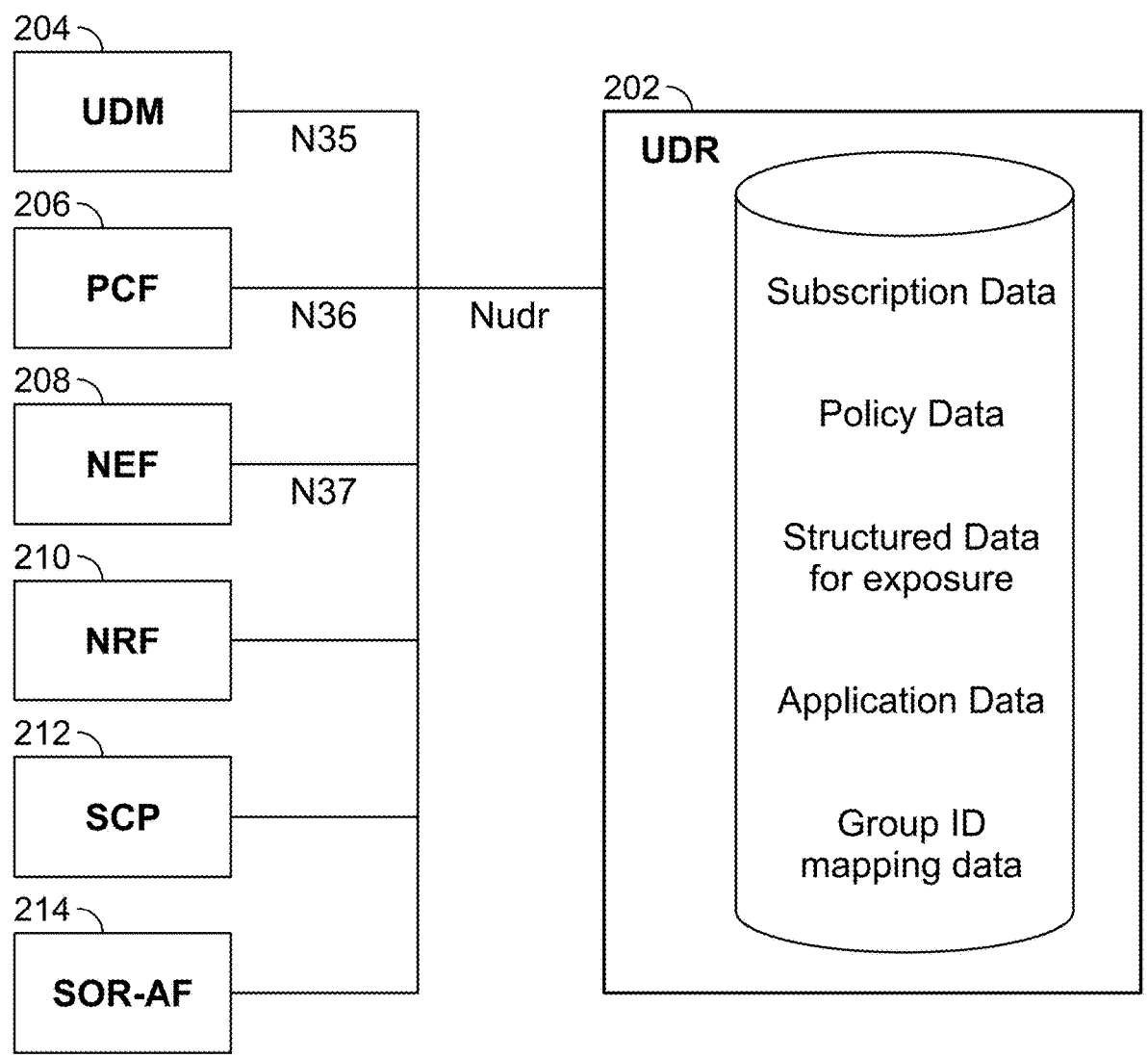
FIG. 2 illustrates a data storage architecture of a 5G Core that includes a Unified Data Repository (UDR) and Unstructured Data Storage Function (UDSF) in accordance with some embodiments.

FIG. 2 illustrates a data storage architecture of a 5G Core that includes a Unified Data Repository (UDR) and Unstructured Data Storage Function (UDSF) in accordance with some embodiments. Referring to FIG. 2, a Unified Data Management (UDM) 204, Policy Control Function (PCF) 206, Network Exposure Function (NEF) 208, Network Repository Function (NRF) 210, Service Communication Proxy (SCP) 212, and Steering of Roaming Application Function (SOR-AF) 214 are in communication with a Unified Data Repository (UDR) and Unstructured Data Storage Function (UDSF) 202 as shown in FIG. 2. As also shown, the UDR can store subscription data, policy data, structured data for exposure, application data, and group ID mapping data.

In an example implementation, an API example for the UDSF, such as an Nudsf_DataRepository API, can be sent to the UDSF network function in a 5G network to search for information in the database. An example of search expression in API query to Nudsf for querying IP mapping information for 10.10.121.99 is as follows: {"op": "EQ", "tag": "uelp", "value": "10.10.121.99" }.

Figure 1B:
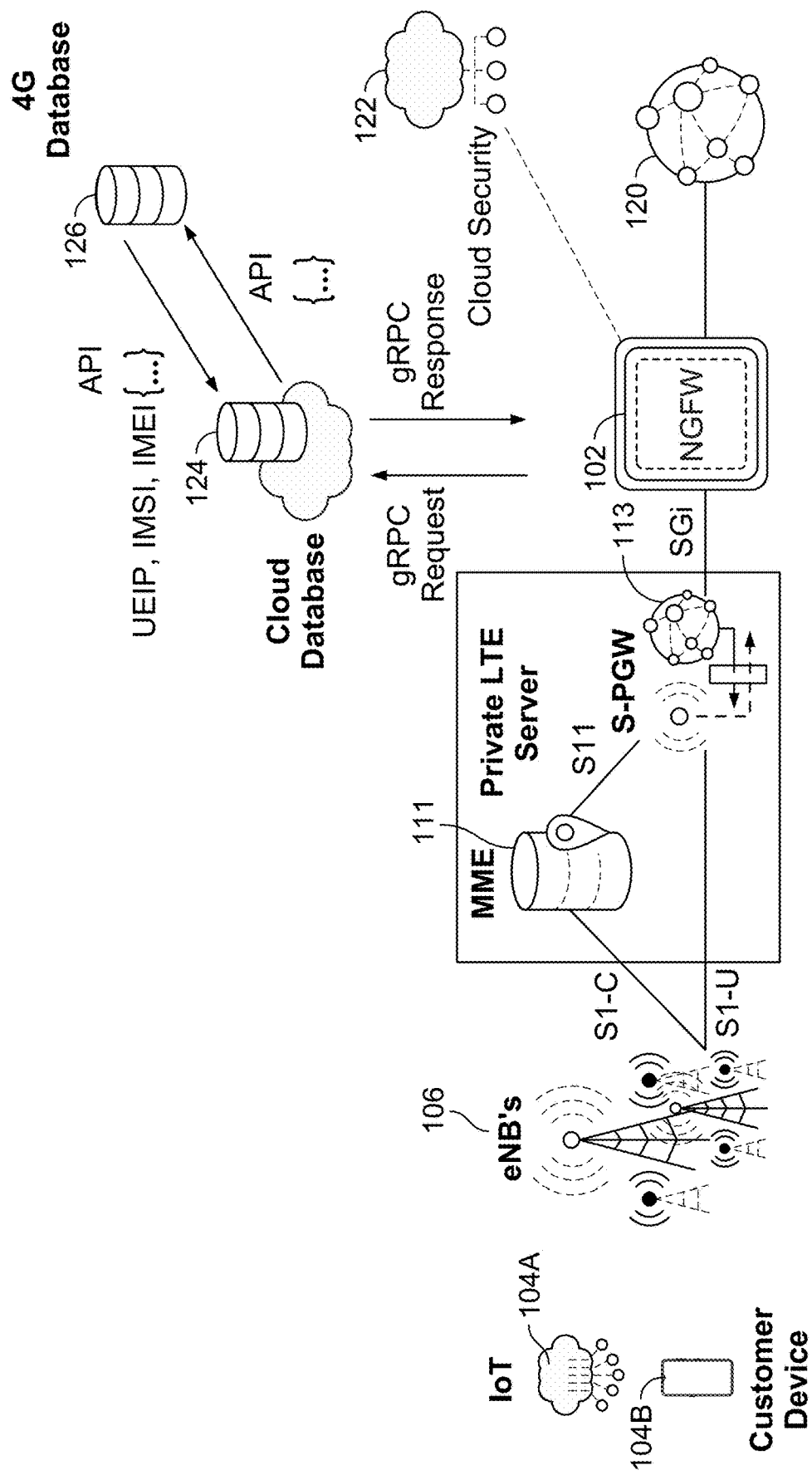
FIG. 1B is a block diagram of an architecture of a 4G/LTE wireless network with a security platform for applying context-based security in mobile networks using an API and a data store in accordance with some embodiments.

FIG. 1B is a block diagram of an architecture of a 4G/LTE wireless network with a security platform for applying context-based security in mobile networks using an API and a data store in accordance with some embodiments. Specifically, FIG. 1B is an example 4G/LTE mobile network environment that includes a Security Platform 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for applying subscriber-ID based security in mobile networks with user-ID and syslog message networks over various interfaces (e.g., SGi and/or other interfaces in a 4G/LTE core network, and N6 interfaces and/or other interfaces in a 5G core network) in mobile networks (e.g., 4G/LTE or later mobile networks) as further described below.

As shown in FIG. 1B, the 4G/LTE mobile network environment can also include Evolved Node B (eNB) access as shown at 106 and/or other networks including, for example, Wi-Fi access and Fixed access (not shown), to facilitate data communications for subscribers (e.g., using User Equipment (UE), such as smart phones, laptops, computers (which may be in a fixed location), and/or other cellular enabled computing devices/equipment, such as IoT devices as shown at 104A and/or UEs, such as a customer device as shown at 104B, or other network communication enabled devices) including over a Packet Data Network (PDN) (e.g., the Internet) 120 to access various applications, web services, content hosts, etc, and/or other networks. Each of the above-described 4G/LTE network access mechanisms are in communication with a Mobility Management Entity (MME) 111 (e.g., a private LTE server) and a Serving-Packet Data Network Gateway (S-PGW) 113. S-PGW 113 is in communication with PDN (Internet) 120 via an SGi interface in which Security Platform 102 is located in line between S-PGW 113 and PDN 120. Security Platform 102 is in communication with S-PGW 113 (e.g., via the N6 interface, as shown) to access UE IP, IMEI, IMSI, and/or other contextual information as will be further described below.

Referring to FIG. 1B, network traffic communications are monitored using Security Platform 102. As shown, network traffic communications are monitored/filtered in the 4G/LTE network using Security Platform 102 (e.g., (virtual) devices/ appliances that each include a firewall (FW), a network sensor acting on behalf of the firewall, or another device/ component that can implement security policies using the disclosed techniques) configured to perform the disclosed techniques for applying context-based security over various interfaces (e.g., SGi and/or other interfaces in a 4G/LTE core network, and N6 and/or other interfaces in a 5G core network) in mobile networks as similarly described above and as further described below.

In this example implementation, the disclosed techniques for applying context-based security in mobile networks using an API and a data store can be performed using a security platform deployed in a 4G/LTE technology-based mobile network, such as shown in FIG. 1B. As similarly described above with respect to FIG. 1A, cloud-based database 124 maintains a global user-IP mapping table and security platform 102 maintains a subset of a user-IP mapping table stored in the security platform. For a packet, the security platform uses the IP address of the packet to query the local user-IP mapping table. The corresponding user information can then be fetched to apply the security policy using the fetched user information. If the user-IP mapping does not exist in the local user-IP mapping table stored in the security platform, then the security platform queries the cloud-based global user-IP mapping database to obtain the user-IP mapping information. In an example implementation, the user-IP mapping query with the cloud-based database can be performed using batch operations on periodic intervals using gRPC to facilitate high performance. If cloud-based global user-IP mapping database 124 does not have the queried user-IP mapping, then it will send an API query with the IP information to another database, shown as a 4G database 126, that stores user contextual information including, for example, IMSI/SUPI, IMEI/PEI, S-NSSAI, APN/DNN, RAT Type, and Location in a mobile network. Examples of such database in 5G include a Unified Data Repository (UDR) and Unstructured Data Storage Function (UDSF), such as shown in FIG. 2 as described above.

In some embodiments, a security platform is further configured to provide the following DPI capabilities: DPI of IP traffic over the SGi interface. In an example implementation, the security platform is configured to provide DPI capabilities (e.g., including to identify an APP ID, a user ID, a content ID, perform URL filtering, etc.) of, for example, IP sessions over SGi interfaces between S-PGW 113 and PDN 120 to apply security on user plane traffic based on a policy (e.g., layer-7 security and/or other security policy enforcement) as further described below. In addition, Security Platform 102 can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the security platforms with dynamic prevention signatures for malware, DNS, URLs, CNC malware, and/or other malware as well as to receive malware samples for further security analysis.

Cloud-Based Data Store Maintains a Global User-IP Mapping Table and Security Platform Maintains a Subset of a User-IP Mapping Table Using an API to Push User Contextual Information to the Cloud-Based Data Store In some embodiments, a data store (e.g., a cloud-based database) maintains a global user-IP mapping table and a security platform maintains a subset of a user-IP mapping table as similarly described above with respect to FIGS. 1A-1B and 2. However, in these embodiments, as further described below with respect to FIGS. 1C-1D, an entity including a database, a network function, and a management system triggers an API based on certain events, such as UE attach and UE detach events. Specifically, the API can be used to push user contextual information to the cloud-based database that includes UE IP and user contextual information, including, for example, IMSI/SUPI, IMEI/PEI, S-NSSAI, APN/DNN, RAT Type, and Location information in a mobile network. The cloud-based database pushes the new and updated user-IP mappings to the security platform using batch operations on regular intervals using gRPC to achieve high performance. APIs can also be used to push user-IP mappings to the security platform.

Figure 1C:
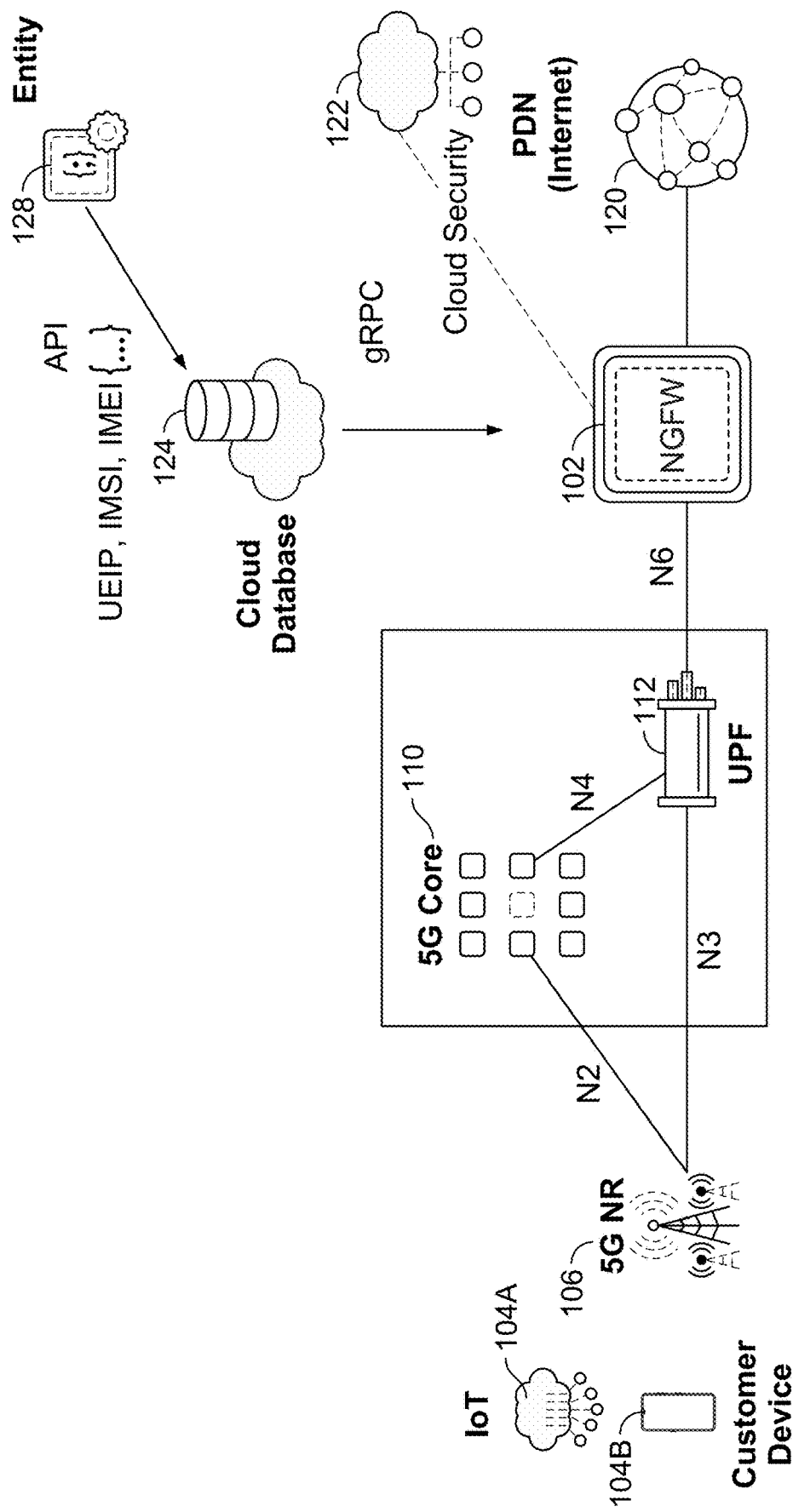
FIG. 1C is another block diagram of an architecture of a 5G wireless network with a security platform for applying context-based security in mobile networks using an API and a data store in accordance with some embodiments.

FIG. 1C is another block diagram of an architecture of a 5G wireless network with a security platform for applying context-based security in mobile networks using an API and a data store in accordance with some embodiments. Referring to FIG. 1C, this architecture is similar to the architecture of a 5G wireless network with a security platform for applying context-based security in mobile networks using an API and a data store described above with respect to FIG. 1A, except this architecture includes an entity 128 (e.g., that can include a database, a network function, and a management system) that triggers an API based on certain events, such as UE attach and UE detach events. Specifically, the API can be used to push user contextual information to cloud-based database 124 that includes UE IP and user contextual information, including, for example, IMSI/SUPI, IMEI/PEI, S-NSSAI, APN/DNN, RAT Type, and Location information in a mobile network. The cloud-based database pushes (e.g., periodically/based on event triggers) the new and updated user-IP mappings to the security platform using batch operations using gRPC to achieve high performance. APIs can also be used to push user-IP mappings to the security platform.

Figure 1D:
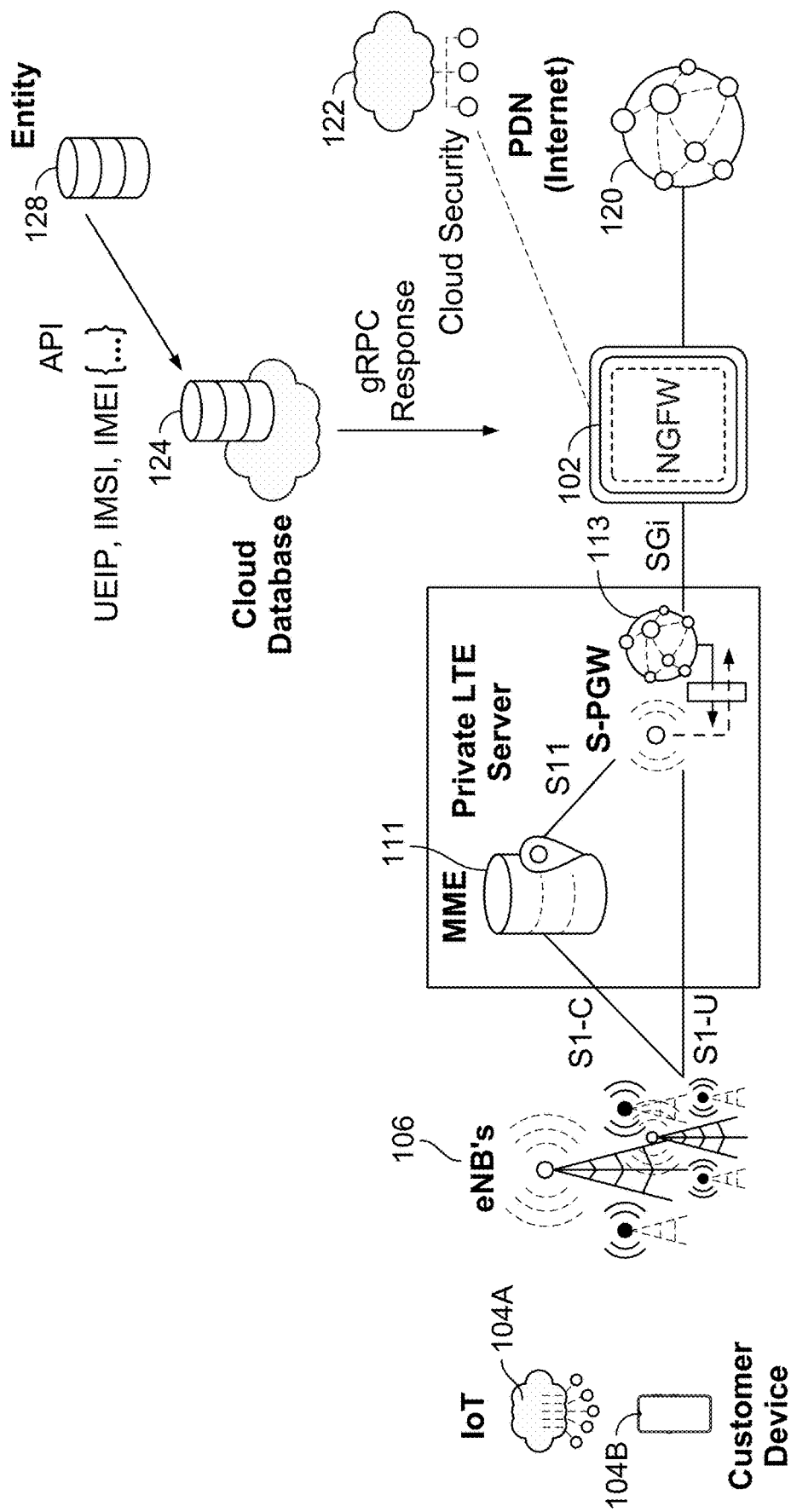
FIG. 1D is another block diagram of an architecture of a 4G/LTE wireless network with a security platform for applying context-based security in mobile networks using an API and a data store in accordance with some embodiments.

FIG. 1D is another block diagram of an architecture of a 4G/LTE wireless network with a security platform for applying context-based security in mobile networks using an API and a data store in accordance with some embodiments. Referring to FIG. 1D, this architecture is similar to the architecture of a 4G/LTE wireless network with a security platform for applying context-based security in mobile networks using an API and a data store described above with respect to FIG. 1B, except this architecture includes an entity 128 (e.g., that can include a database, a network function, and a management system) that triggers an API based on certain events, such as UE attach and UE detach events. Specifically, the API can be used to push user contextual information to cloud-based database 124 that includes UE IP and user contextual information, including, for example, IMSI/SUPI, IMEI/PEI, S-NSSAI, APN/DNN, RAT Type, and Location information in a mobile network. The cloud-based database pushes (e.g., periodically/based on event triggers) the new and updated user-IP mappings to the security platform using batch operations using gRPC to achieve high performance. APIs can also be used to push user-IP mappings to the security platform.

Security Platform Maintains a User-IP Mapping Table Using an API to Push User Contextual Information to the Security Platform Based on Events In some embodiments, a security platform maintains a user-IP mapping table as similarly described above with respect to FIGS. 1A-1B and 2, except in this example, the security platform maintains a complete (not a subset of the) user-IP mapping table. As such, in these embodiments, such as further described below with respect to FIGS. 1E-1F, an entity including a database, a network function, and a management system triggers an API based on certain events, such as UE attach and UE detach events. Specifically, the API can be used to push user contextual information to the security platform that includes UE IP and user contextual information, including, for example, IMSI/SUPI, IMEI/PEI, S-NSSAI, APN/DNN, RAT Type, and Location information in a mobile network.

Figure 1E:
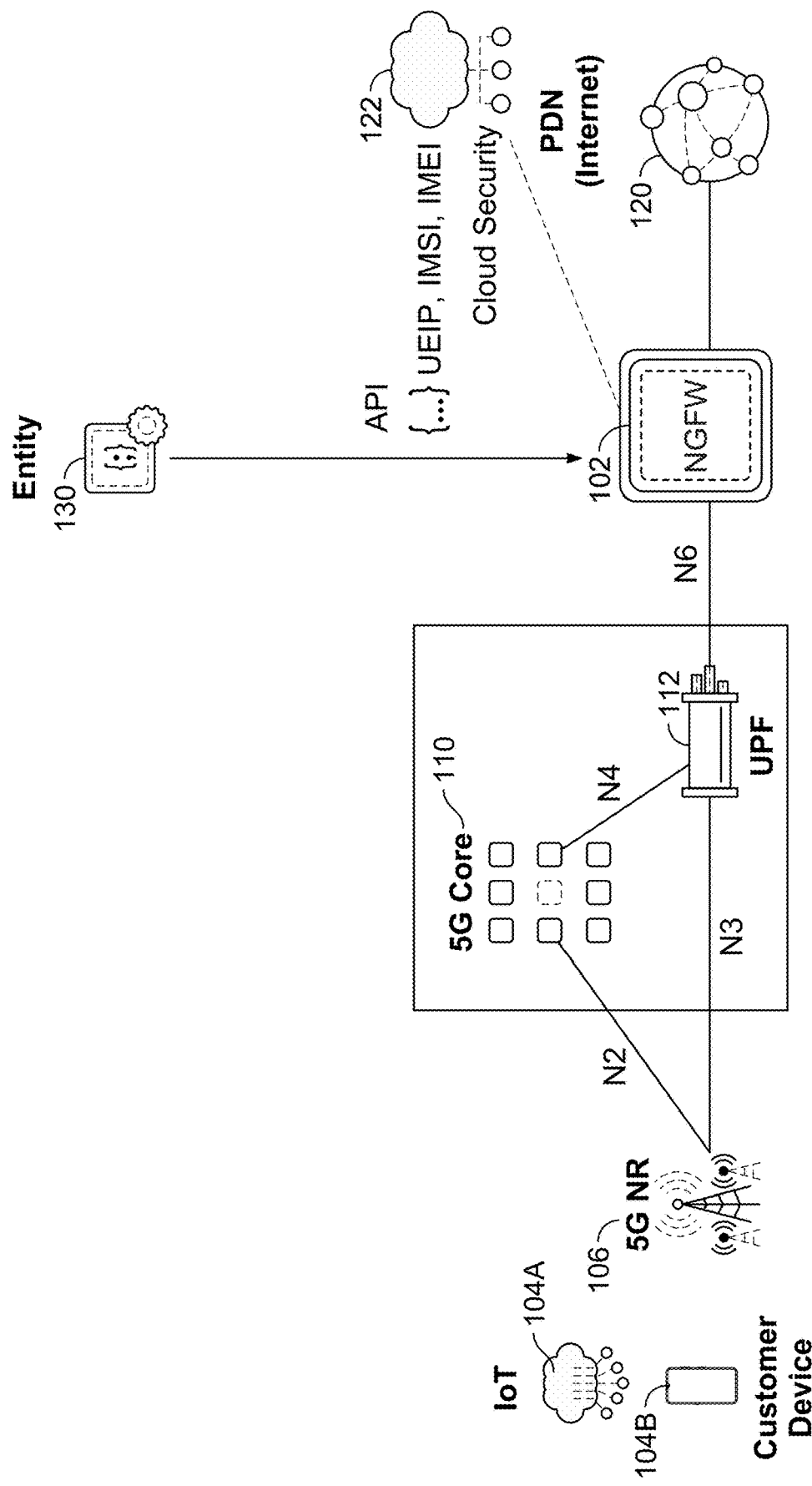
FIG. 1E is yet another block diagram of an architecture of a 5G wireless network with a security platform for applying context-based security in mobile networks using an API and a data store in accordance with some embodiments.

FIG. 1E is yet another block diagram of an architecture of a 5G wireless network with a security platform for applying context-based security in mobile networks using an API and a data store in accordance with some embodiments. Referring to FIG. 1E, this architecture is similar to the architecture of a 5G wireless network with a security platform for applying context-based security in mobile networks using an API and a data store described above with respect to FIG. 1A, except this architecture includes an entity 130 (e.g., that can include a database, a network function, and a management system) that triggers an API based on certain events, such as UE attach and UE detach events. Specifically, the API can be used to push user contextual information to the security platform that includes UE IP and user contextual information, including, for example, IMSI/SUPI, IMEI/PEI, S-NSSAI, APN/DNN, RAT Type, and Location information in a mobile network.

Figure 1F:
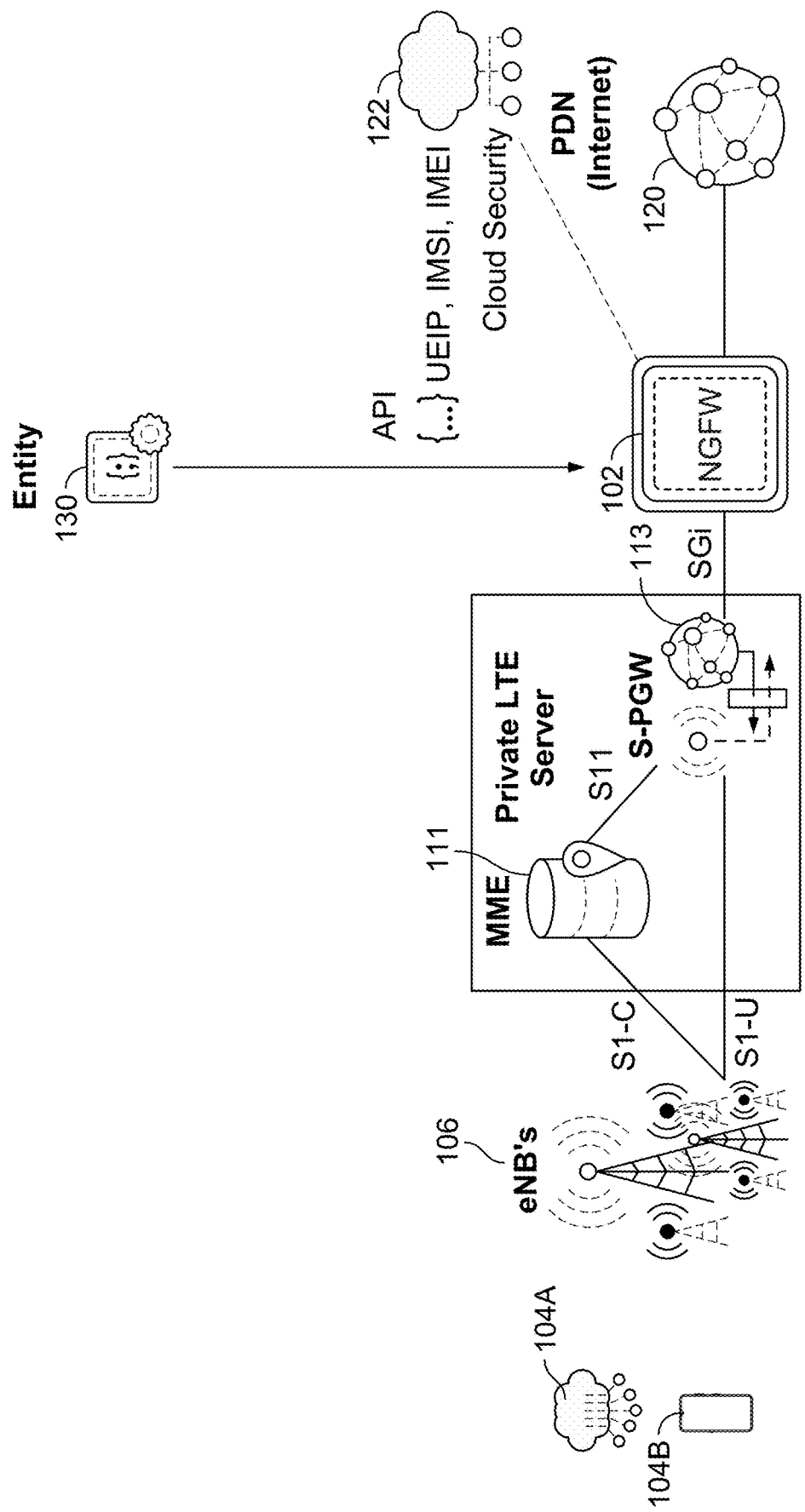
FIG. 1F is yet another block diagram of an architecture of a 4G/LTE wireless network with a security platform for applying context-based security in mobile networks using an API and a data store in accordance with some embodiments.

FIG. 1F is yet another block diagram of an architecture of a 4G/LTE wireless network with a security platform for applying context-based security in mobile networks using an API and a data store in accordance with some embodiments. Referring to FIG. 1F, this architecture is similar to the architecture of a 4G/LTE wireless network with a security platform for applying context-based security in mobile networks using an API and a data store described above with respect to FIG. 1B, except this architecture includes an entity 130 (e.g., that can include a database, a network function, and a management system) that triggers an API based on certain events, such as UE attach and UE detach events. Specifically, the API can be used to push user contextual information to the security platform that includes UE IP and user contextual information, including, for example, IMSI/SUPI, IMEI/PEI, S-NSSAI, APN/DNN, RAT Type, and Location information in a mobile network.

As such, service providers and/or enterprises can use the disclosed techniques and security platform to apply context-based security in mobile networks using an API and a data store (e.g., a database or another data store).

Example Use Cases of Applying Context-Based Security in Mobile Networks Using an API and a Data Store The disclosed techniques for providing enhanced security for mobile/service provider networks using a security platform for security policy enforcement, including for applying context-based security using an API and a data store, can be applied in a variety of additional example use case scenarios for facilitating enhanced security for mobile networks (e.g., 4G/5G/6G and later mobile networks) as will now be described with respect to various example use cases.

As a first example use case, the disclosed techniques for applying context-based security in mobile networks using an API and a data store can be used for protecting 5G users of an enterprise from threats exploiting open source vulnerabilities. Examples of such open source vulnerabilities include the following: (1) CVE-2022-26245—Open-Falcon Falcon-Plus SQL Injection Vulnerability; (2) CVE-2022-1178—OpenEMR Stored Cross-Site Scripting Vulnerability; (3) CVE-2021-43829—Patrowl Manager Unrestricted File Upload Vulnerability; (4) CVE-2022-29036—Jenkins Credentials Plugin Stored Cross-Site Scripting Vulnerability; (5) CVE-2022-1429—Pimcore GridHelperService.php SQL Injection Vulnerability; (6) CVE-2020-13937—Apache Kylin REST API Admin Configuration Information Disclosure Vulnerability; and (7) CVE-2022-24706—Apache CouchDB Remote Code Execution Vulnerability.

As a second example use case, the disclosed techniques for applying context-based security in mobile networks using an API and a data store can be used for providing advanced L7 security control for critical infrastructure devices connected to a 4G/LTE and/or 5G network. Examples of relevant vulnerabilities include the following: (1) CVE-2021-33550—Geutebruck Command Injection Vulnerability (Camera devices); (2) CVE-2021-43982—Delta Industrial Automation CNCSoft Screen Editor Stack Buffer Overflow Vulnerability; (3) CVE-2022-26833—Open Automation Software OAS Platform Authentication Bypass Vulnerability; and (4) CVE-2022-24315—Schneider Electric IGSS Out-of-Bounds Read Vulnerability.

As a third example use case, the disclosed techniques for applying context-based security in mobile networks using an API and a data store can be used for providing an advanced threat prevention service to manufacturing vertical enterprise 4G/LTE and/or 5G customers. Examples of relevant vulnerabilities include the following: (1) CVE-2022-26501—Veeam Backup and Replication Authentication Bypass Vulnerability; (2) CVE-2022-22972—VMware Workspace Authentication Bypass Vulnerability; and (3) CVE-2022-22960—VMware Workspace Privilege Escalation Vulnerability. Examples of relevant spyware include the following: (1) Daxin Command and Control Traffic; (2) Revenge RAT Command and Control Traffic; (3) Fragtor Command and Control Traffic; (4) Vundo Command and Control Traffic; and (5) KRBanker Command and Control Traffic.

As will now be apparent to one of ordinary skill in the art, the disclosed techniques for applying context-based security in mobile networks using an API and a data store can be applied in a variety of additional example use case scenarios to detect/prevent these and other types of attacks for facilitating enhanced security for various deployments and environments in mobile networks.

Figure 3:
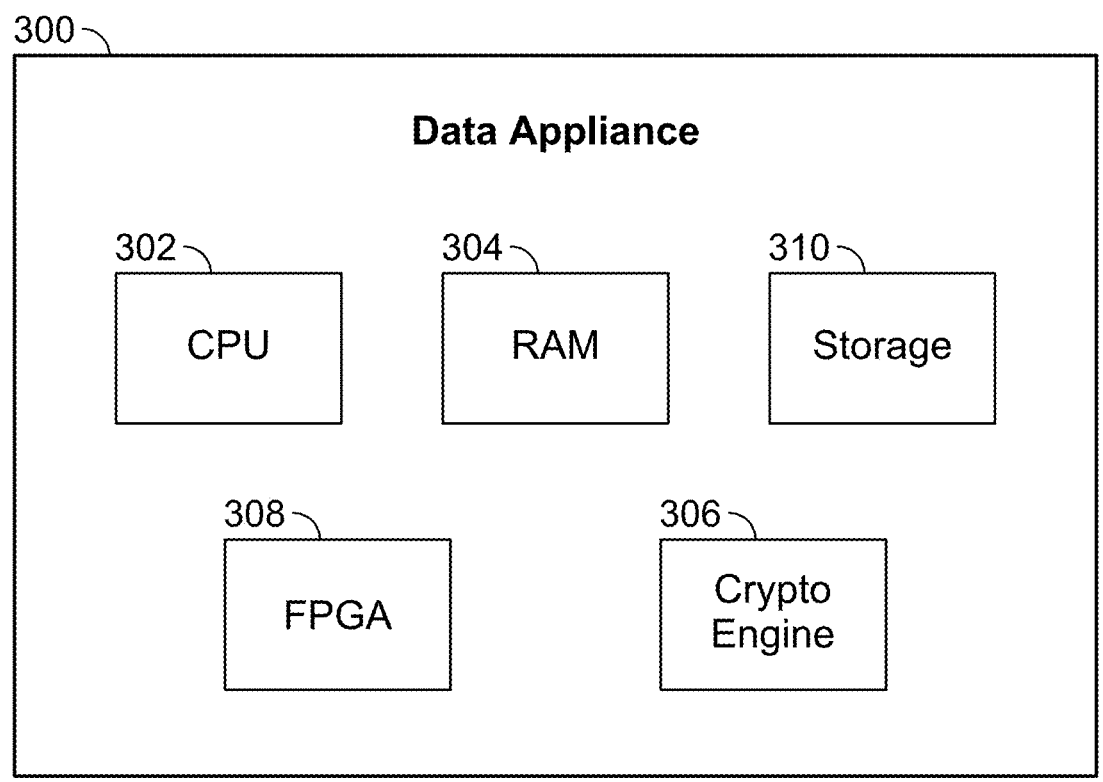
FIG. 3 is a functional diagram of hardware components of a network device for applying context-based security in mobile networks using an API and a data store in accordance with some embodiments.

Example Hardware Components of a Network Device for Applying Context-Based Security in Mobile Networks Using an API and a Data Store FIG. 3 is a functional diagram of hardware components of a network device for applying context-based security in mobile networks using an API and a data store in accordance with some embodiments. The example shown is a representation of physical/hardware components that can be included in network device 300 (e.g., an appliance, gateway, or server that can implement the security platform disclosed herein). Specifically, network device 300 includes a high performance multi-core CPU 302 and RAM 304. Network device 300 also includes a storage 310 (e.g., one or more hard disks or solid state storage units), which can be used to store policy and other configuration information as well as signatures. In one embodiment, storage 310 stores certain information (e.g., subscriber-ID, equipment-ID, and/or network slice-ID along with user-ID and syslog messages related/extracted parameters) that is extracted from monitored traffic over various interfaces (e.g., SGi, N6, and/or other interfaces) that are monitored for implementing the disclosed security policy enforcement techniques for applying context-based security over various interfaces including the disclosed techniques for applying subscriber-ID based security, equipment-ID based security, and/or network slice-ID based security with user-ID and syslog messages in mobile networks using a security platform(s) as described herein. Network device 300 can also include one or more optional hardware accelerators. For example, network device 300 can include a cryptographic engine 306 configured to perform encryption and decryption operations, and one or more FPGAs 308 configured to perform signature matching, act as network processors, and/or perform other tasks.

Figure 4:
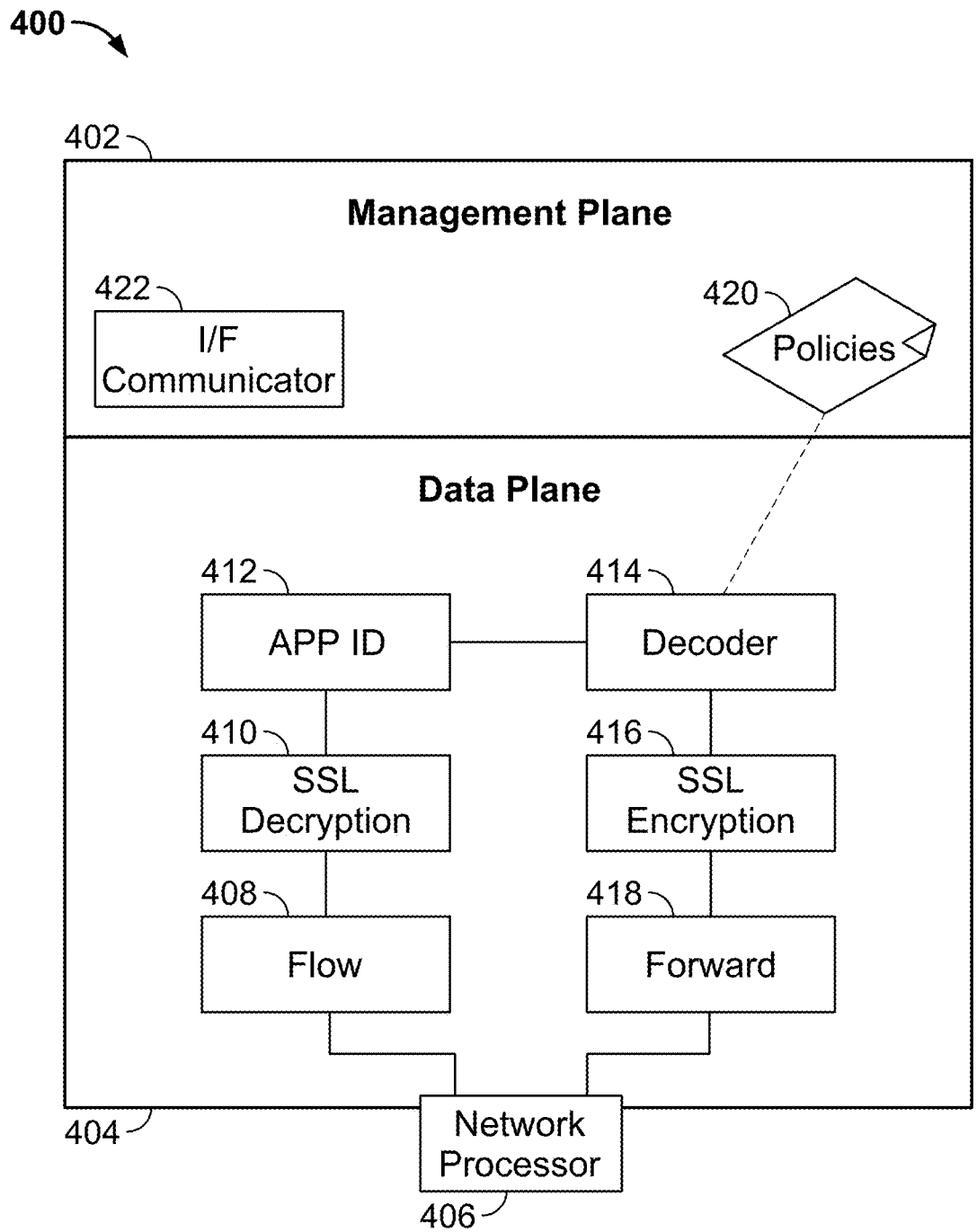
FIG. 4 is a functional diagram of logical components of a network device for applying context-based security in mobile networks using an API and a data store in accordance with some embodiments.

Example Logical Components of a Network Device for Applying Context-Based Security in Mobile Networks Using an API and a Data Store FIG. 4 is a functional diagram of logical components of a network device for applying context-based security in mobile networks using an API and a data store in accordance with some embodiments. The example shown is a representation of logical components that can be included in network device 400 (e.g., a data appliance, which can implement the disclosed security function/platform and perform the disclosed techniques for applying subscriber-ID based security, equipment-ID based security, and/or network slice-ID based security with user-ID and syslog messages in mobile networks). As shown, network device 400 includes a management plane 402 and a data plane 404. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, a MEC service, an IoT device, or another resource) using an encrypted session protocol, such as SSL. Network processor 406 is configured to monitor packets from the mobile device and provide the packets to data plane 404 for processing. Flow 408 identifies the packets as being part of a new session and creates a new session flow. Subsequent packets will be identified as belonging to the session based on a flow lookup. If applicable, SSL decryption is applied by SSL decryption engine 410 using various techniques as described herein. Otherwise, processing by SSL decryption engine 410 is omitted. Application identification (APP ID) module 412 is configured to determine what type of traffic the session involves (e.g., IP traffic and/or other network protocols of traffic, such as GTP-U traffic, between various monitored interfaces as similarly described above with respect to FIGS. 1A-1F) and to identify a user associated with the traffic flow (e.g., to identify a user-ID and an application-ID (APP-ID) as described herein). For example, APP ID 412 can recognize a GET request in the received data and conclude that the session requires an HTTP decoder 414. As another example, APP ID 412 can recognize GTP-U session messages carrying encapsulated IP traffic from UEs (e.g., over various interfaces, such as similarly described above with respect to FIGS. 1A-1F) and conclude that the session requires a GTP-U decoder (e.g., to extract information exchanged in the GTP-U traffic session over various interfaces including various parameters, such as similarly described above with respect to FIGS. 1A-1F). For each type of protocol, there exists a corresponding decoder 414. In one embodiment, the application identification is performed by an application identification module (e.g., APP ID component/engine), and a user identification is performed by another component/engine. Based on the determination made by APP ID 412, the packets are sent to an appropriate decoder 414. Decoder 414 is configured to assemble packets (e.g., which may be received out of order) into the correct order, perform tokenization, and extract out information (e.g., such as to extract various information exchanged in GTP-U traffic over various interfaces as similarly described above and further described below). Decoder 414 also performs signature matching to determine what should happen to the packet. SSL encryption engine 416 performs SSL encryption using various techniques as described herein and the packets are then forwarded using a forward component 418 as shown. As also shown, policies 420 are received and stored in the management plane 402. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored GTP-U/IP traffic and/or DPI of monitored GTP-U/IP and/or other protocol(s) traffic, such as SGi/N6/other interfaces as similarly described above with respect to FIGS. 1A-1F) is applied as described herein with respect to various embodiments based on the monitored, decrypted, identified, and decoded session traffic flows.

As also shown in FIG. 4, an interface (I/F) communicator 422 is also provided for security platform manager communications. In some cases, network communications of other network elements on the service provider network are monitored using network device 400, and data plane 404 supports decoding of such communications (e.g., network device 400, including I/F communicator 422 and decoder 414, can be configured to monitor and/or communicate on, for example, reference point interfaces such as SGi, N6, and/or other interfaces where wired and wireless network traffic flow exists). As such, network device 400 including I/F communicator 422 can be used to implement the disclosed techniques for applying context-based security in mobile networks using an API and a data store as described above and as will be further described below.

Additional example processes for the disclosed techniques for applying context-based security in mobile networks using an API and a data store will now be described.

Figure 5:
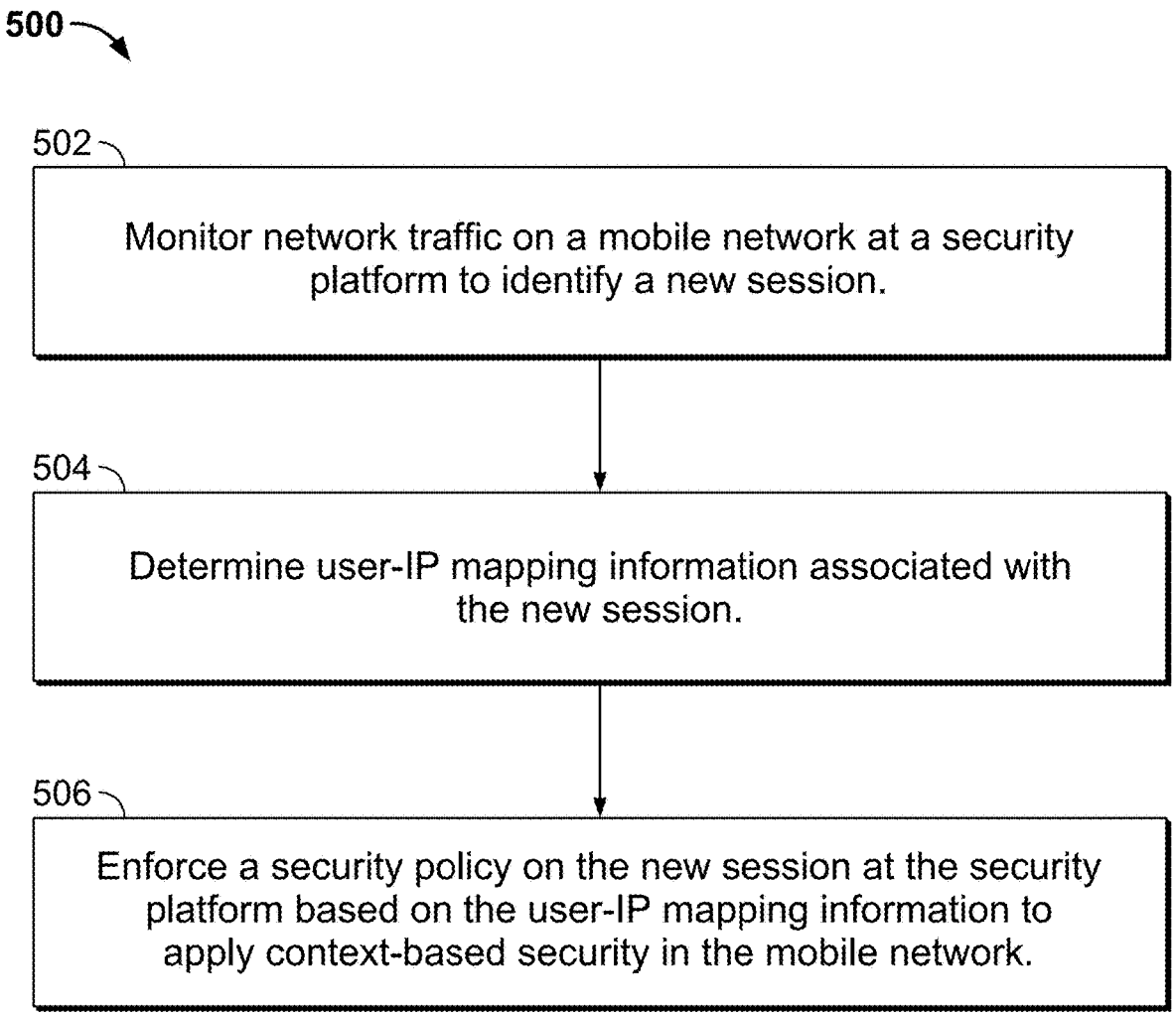
FIG. 5 is a flow diagram of a process for applying context-based security in mobile networks using an API and a data store in accordance with some embodiments.

Example Processes for Applying Context-Based Security in Mobile Networks Using an API and a Data Store FIG. 5 is a flow diagram of a process for applying context-based security in mobile networks using an API and a data store in accordance with some embodiments. In some embodiments, a process 500 as shown in FIG. 5 is performed by the security platform and techniques as similarly described above including the embodiments described above with respect to FIGS. 1A-4. In one embodiment, process 500 is performed by data appliance 300 as described above with respect to FIG. 3, network device 400 as described above with respect to FIG. 4, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 502, monitoring network traffic on a mobile network at a security platform to identify a new session is performed. For example, the security platform (e.g., a firewall, a network sensor acting on behalf of the firewall, or another device/component that can implement security policies) can monitor, in some cases, various protocols, such as GTP-U (e.g., over SGi, N6, and/or other interfaces) and/or other protocols, on the mobile network and, more specifically, by performing the disclosed techniques can monitor various interfaces, such as the SGi and N6 interfaces, as similarly described above with respect to FIGS. 1A-1B.

At 504, determining user-IP mapping information associated with the new session is performed. For example, the user-IP mapping information associated with the new session can be implemented by performing at least one of the following as similarly described above with respect to FIGS. 1A-1B and 2: querying a local user-IP mapping table stored at the security platform using an IP address of a packet associated with the new session; querying a cloud-based data store using the IP address of the packet associated with the new session if the IP address is not stored in the local user-IP mapping table; and sending an API query to another data store that includes user contextual information if the IP address is not stored in the cloud-based data store.

At 506, enforcing a security policy on the new session at the security platform based on the user-IP mapping information to apply context-based security in the mobile network is performed. For example, security policy enforcement can include allowing or blocking the session.

Figure 6:
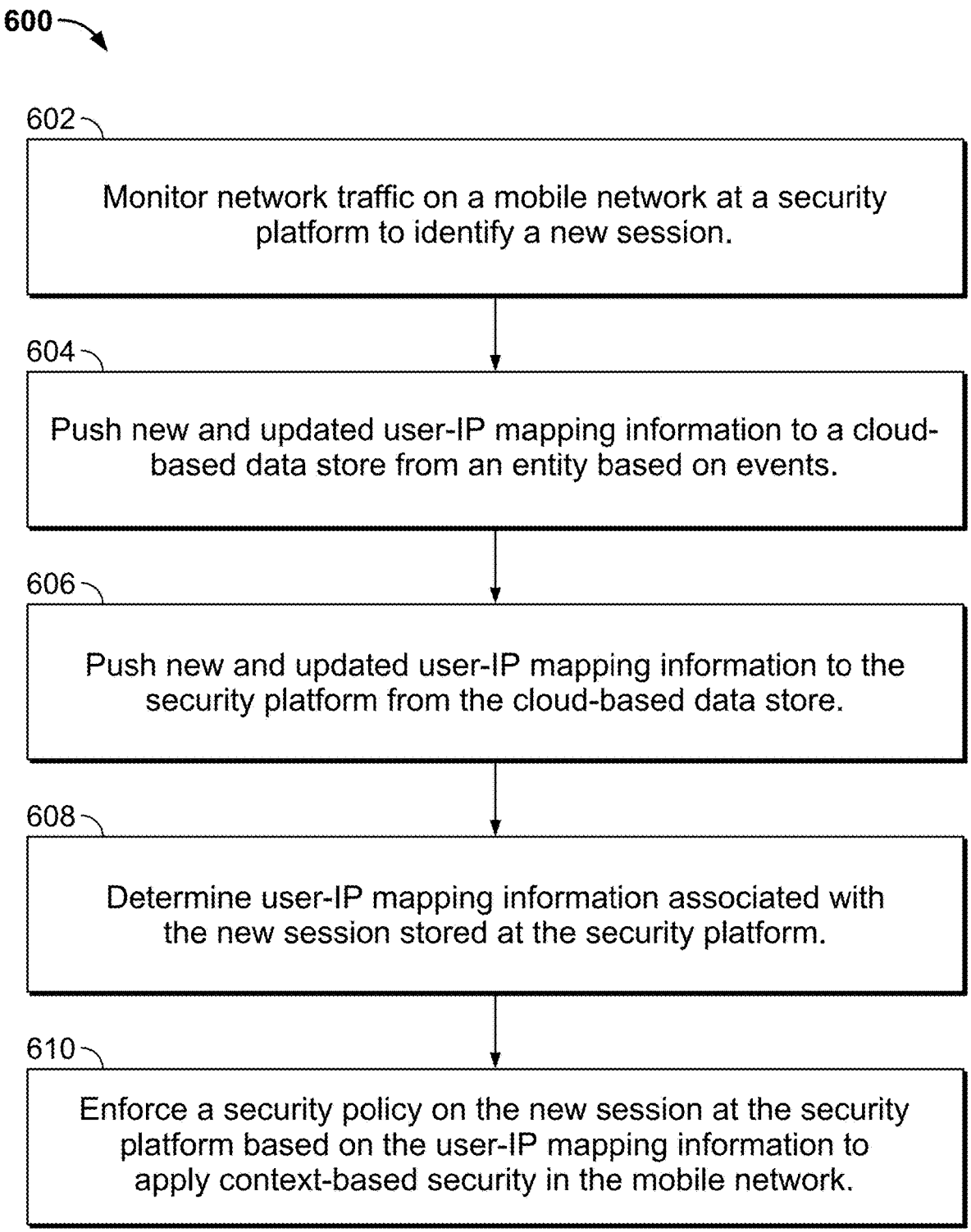
FIG. 6 is another flow diagram of a process for applying context-based security in mobile networks using an API and a data store in accordance with some embodiments.

FIG. 6 is another flow diagram of a process for applying context-based security in mobile networks using an API and a data store in accordance with some embodiments. In some embodiments, a process 600 as shown in FIG. 6 is performed by the security platform and techniques as similarly described above including the embodiments described above with respect to FIGS. 1A-4. In one embodiment, process 600 is performed by data appliance 300 as described above with respect to FIG. 3, network device 400 as described above with respect to FIG. 4, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, monitoring network traffic on a mobile network at a security platform to identify a new session is performed. For example, the security platform (e.g., a firewall, a network sensor acting on behalf of the firewall, or another device/component that can implement security policies) can monitor, in some cases, various protocols, such as GTP-U (e.g., over SGi, N6, and/or other interfaces) and/or other protocols, on the mobile network and, more specifically, by performing the disclosed techniques can monitor various interfaces, such as the SGi and N6 interfaces, as similarly described above with respect to FIGS. 1A-1B and 1C-1D.

At 604, pushing new and updated user-IP mapping information to a cloud-based data store from an entity based on events is performed. For example, the entity, which can include a database, network function, and management system, can trigger an API based on events, such as UE attach and UE detach events, to push contextual information updates (e.g., UE IP and user's contextual information including IMSI/SUPI, IMEI/PEI, S-NSSAI, APN/DNN, RAT Type, and Location in a mobile network) to the cloud-based data store, as similarly described above with respect to FIGS. 1C-1D and 2.

At 606, pushing new and updated user-IP mapping information to the security platform from the cloud-based data store is performed. For example, the cloud-based database can push new and updated user-IP mappings to the security platform using batch operations on periodic intervals using gRPC and/or other APIs, as similarly described above with respect to FIGS. 1C-1D.

At 608, determining user-IP mapping information associated with the new session stored at the security platform is performed. For example, the user-IP mapping information associated with the new session is pushed based on events to the local storage of the security platform as similarly described above with respect to FIGS. 1C-1D.

At 610, enforcing a security policy on the new session at the security platform based on the user-IP mapping information to apply context-based security in the mobile network is performed. For example, security policy enforcement can include allowing or blocking the session.

Figure 7:
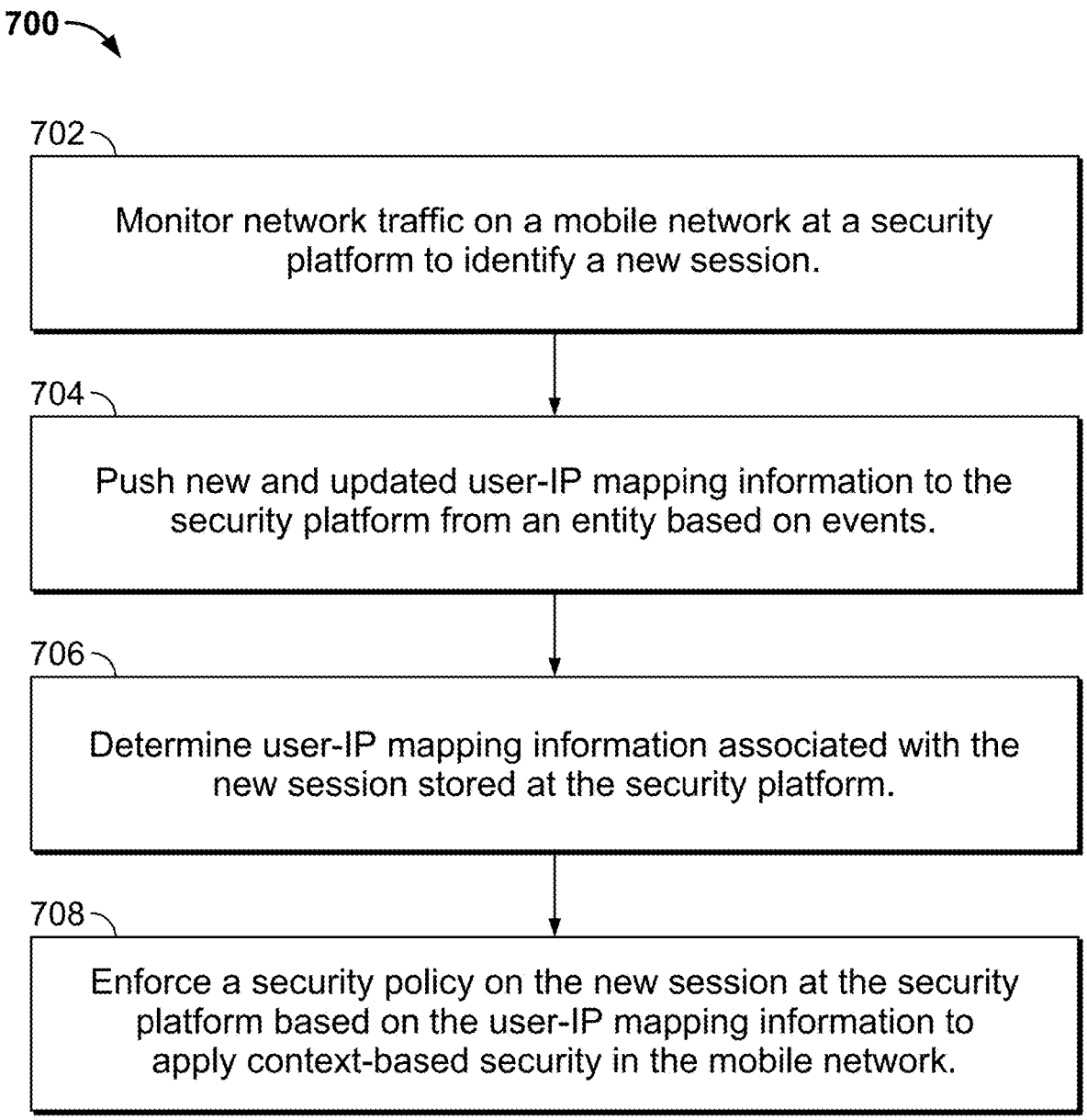
FIG. 7 is another flow diagram of a process for applying context-based security in mobile networks using an API and a data store in accordance with some embodiments.

FIG. 7 is another flow diagram of a process for applying context-based security in mobile networks using an API and a data store in accordance with some embodiments. In some embodiments, a process 700 as shown in FIG. 7 is performed by the security platform and techniques as similarly described above including the embodiments described above with respect to FIGS. 1A-4. In one embodiment, process 700 is performed by data appliance 300 as described above with respect to FIG. 3, network device 400 as described above with respect to FIG. 4, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 702, monitoring network traffic on a mobile network at a security platform to identify a new session is performed. For example, the security platform (e.g., a firewall, a network sensor acting on behalf of the firewall, or another device/component that can implement security policies) can monitor, in some cases, various protocols, such as GTP-U (e.g., over SGi, N6, and/or other interfaces) and/or other protocols, on the mobile network and, more specifically, by performing the disclosed techniques can monitor various interfaces, such as the SGi and N6 interfaces, as similarly described above with respect to FIGS. 1A-1B and 1E-1F.

At 704, pushing new and updated user-IP mapping information to the security platform from an entity based on events is performed. For example, the entity, which can include a database, network function, and management system, can trigger an API based on events, such as UE attach and UE detach events, to push contextual information updates (e.g., UE IP and user's contextual information including IMSI/SUPI, IMEI/PEI, S-NSSAI, APN/DNN, RAT Type, and Location in a mobile network) to the security platform, as similarly described above with respect to FIGS. 1E-1F and 2.

At 706, determining user-IP mapping information associated with the new session stored at the security platform is performed. For example, the user-IP mapping information associated with the new session is pushed based on events to the local storage of the security platform as similarly described above with respect to FIGS. 1E-1F.

At 708, enforcing a security policy on the new session at the security platform based on the user-IP mapping information to apply context-based security in the mobile network is performed. For example, security policy enforcement can include allowing or blocking the session.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor network traffic on a mobile network at a security platform to identify a new session;
determine user-IP mapping information associated with the new session by performing the following:
query a local user-IP mapping table stored at the security platform using an IP address of a packet associated with the new session;
query a cloud-based data store using the IP address of the packet associated with the new session if the IP address is not stored in the local user-IP mapping table; and
send an API query to another data store that includes user contextual information if the IP address is not stored in the cloud-based data store; and
enforce a security policy on the new session at the security platform based on the user-IP mapping information to apply context-based security in the mobile network; and
a memory coupled to the processor and configured to provide the processor with instructions.

2. The system recited in claim 1, wherein the context-based security includes subscriber-ID based security.

3. The system recited in claim 1, wherein the context-based security includes equipment-ID based security.

4. The system recited in claim 1, wherein the context-based security includes network slice-ID based security.

5. The system recited in claim 1, wherein the security platform is configured with a plurality of security policies to apply subscriber-ID based security, equipment-ID based security, and/or network slice-ID based security in the mobile network.

6. The system recited in claim 1, wherein the processor is further configured to:
perform level threat identification and prevention in the mobile network.

7. The system recited in claim 1, wherein the processor is further configured to:
perform application identification and control in the mobile network.

8. The system recited in claim 1, wherein the processor is further configured to:
perform URL filtering in the mobile network.

9. The system recited in claim 1, wherein the processor is further configured to:
block the new session from accessing a resource based on the security policy.

10. The system recited in claim 1, wherein the processor is further configured to:
allow the new session to access a resource based on the security policy.

11. A method, comprising:
monitoring network traffic on a mobile network at a security platform to identify a new session;
determining user-IP mapping information associated with the new session by performing the following:
querying a local user-IP mapping table stored at the security platform using an IP address of a packet associated with the new session;
querying a cloud-based data store using the IP address of the packet associated with the new session if the IP address is not stored in the local user-IP mapping table; and
sending an API query to another data store that includes user contextual information if the IP address is not stored in the cloud-based data store; and
enforcing a security policy on the new session at the security platform based on the user-IP mapping information to apply context-based security in the mobile network.

12. The method of claim 11, wherein the context-based security includes subscriber-ID based security.

13. The method of claim 11, wherein the context-based security includes equipment-ID based security.

14. The method of claim 11, wherein the context-based security includes network slice-ID based security.

15. The method of claim 11, further comprising:
blocking the new session from accessing a resource based on the security policy.

16. A computer program product, the computer program product being embodied in a non-transitory computer readable storage medium and comprising computer instructions for:
monitoring network traffic on a mobile network at a security platform to identify a new session;
determining user-IP mapping information associated with the new session by performing the following:
querying a local user-IP mapping table stored at the security platform using an IP address of a packet associated with the new session;
querying a cloud-based data store using the IP address of the packet associated with the new session if the IP address is not stored in the local user-IP mapping table; and
sending an API query to another data store that includes user contextual information if the IP address is not stored in the cloud-based data store; and
enforcing a security policy on the new session at the security platform based on the user-IP mapping information to apply context-based security in the mobile network.

17. The computer program product recited in claim 16, wherein the context-based security includes subscriber-ID based security.

18. The computer program product recited in claim 16, wherein the context-based security includes equipment-ID based security.

19. The computer program product recited in claim 16, wherein the context-based security includes network slice-ID based security.

20. The computer program product recited in claim 16, further comprising computer instructions for:
blocking the new session from accessing a resource based on the security policy.

* * * * *